United States Patent [19]
Zimmer

[11] 3,911,924
[45] Oct. 14, 1975

[54] CRYOPROBE

[75] Inventor: Hildebrand Zimmer, Ahrensburg, Germany

[73] Assignee: Dragerwerk Aktiengesellschaft, Germany

[22] Filed: Apr. 16, 1974

[21] Appl. No.: 461,394

[30] Foreign Application Priority Data
Apr. 19, 1973 Germany.......................... 2319922

[52] U.S. Cl. ............................................. 128/303.1
[51] Int. Cl.² ........................................ A61B 17/36
[58] Field of Search.......................... 128/2 V, 303.1

[56] References Cited
UNITED STATES PATENTS

| | | |
|---|---|---|
| 3,272,203 | 9/1966 | Chato .............................. 128/303.1 |
| 3,421,508 | 1/1969 | Nestrock........................... 128/303.1 |
| 3,662,755 | 5/1972 | Rautenbach et al............. 128/303.1 |
| 3,664,344 | 5/1972 | Bryne................................ 128/303.1 |
| 3,696,813 | 10/1972 | Wallach........................... 128/303.1 |
| 3,721,227 | 3/1973 | Larson et al........................ 128/2 V |

*Primary Examiner*—Channing L. Page
*Attorney, Agent, or Firm*—McGlew and Tuttle

[57] ABSTRACT

A cryoprobe for treating biological tissues, includes a probe having a probe contacting surface which is cooled by cooling means circulated through a probe housing and directed into an evaporation chamber adjacent the surface. The probe includes an ultrasonic observation device in the form of an ultrasonic sound wave producer with a conductor which terminates at the probe contact surface.

3 Claims, 2 Drawing Figures

CRYOPROBE

BACKGROUND OF THE INVENTION

1. Field of the Invention

This invention relates in general to medical examination devices and in particular to a new and useful cryoprobe for treating biological tissues.

2. Description of the Prior Art

The present invention deals particularly with the construction of a cryoprobe which is used to examine biological tissues and which may be employed to destroy tumors which are present in the tissues. In carrying out such cold treatments of tumors in biological tissues the position of the tumor on the surface of the tissue can be determined by the treating physician in a simple manner but the extension of the tumor in depth cannot be determined. Even though this is true the extension of the depth of the tumor determines how long the probe placed on the surface of the tumor is to be supplied with the cooling agent in order to obtain a complete freezing of the tumor. For this reason in carrying out the cold treatment with the known constructions of cryoprobes there is always a risk that the time of the freezing will not be properly chosen. If the freezing time is too short a portion of the tumor will remain in the tissue undestroyed and if the freezing time is too long too much of the sound tissue surrounding the tumor will be destroyed.

SUMMARY OF THE INVENTION

The present invention provides a cryoprobe construction which is capable of carrying out controlled cooling of a tissue with precision and without any danger that there will be an undercooling or an overcooling. For this purpose the cryoprobe is combined with an ultrasonic observation device. Such an ultrasonic observation device makes it possible to distinguish a tumorous tissue from a sound tissue. With the inventive arrangement the probe housing is provided with means for conducting coolant into an evaporation chamber directly adjacent a probe contact surface and in addition an ultrasonic observation device includes means for generating ultrasonic sound waves which are conducted through a conductor to the surface. In this manner the physician is able to determine a tumorous tissue from a sound tissue and to also determine the depth of any tumorous tissue. In addition after freezing the ultrasonic observation device is also capable of recognizing the extent of the ice ball formation produced in the tissue because ultrasonic waves are reflected also on the interface between ice and water. All of this means that the physician is capable of carrying out a most exactly directed treatment. The inventive arrangement is particularly satisfactory for the treatment of tumors in the liver.

In an advantageous embodiment the probe is formed with a longitudinal bore having an ultrasonic conductor extending therethrough up to the probe contacting surface at the end of the probe. With such an arrangement the head for producing ultrasonic sound waves may be arranged at the opposite end of the housing of the probe from the contact surface of the probe.

The probe point or contacting surface is advantageously designed as a freezing head which has a planar treatment surface with a central area including the ultrasonic conductor. For treating tumors this arrangement is particularly suitable. The ultrasonic conductor is advantageously made of a methyl methacrylate because this material has approximately the same ultrasonic resistance as ice. A very satisfactory coupling of the ultrasonic conductor to the deep frozen tissue is thereby obtained.

Accordingly it is an object of the invention to provide a cryoprobe which comprises a housing having a probe contact end and means on said housing for cooling the probe contact end and further including an ultrasonic observation device which includes an ultrasonic sound wave producer having a conductor terminating at the probe contact end.

A further object of the invention is to provide a probe for treating biological tissues which comprises a combined cooling probe head and ultrasonic observation device.

A further object of the invention is to provide a cryoprobe which is simple in design, rugged in construction and economical to manufacture.

For an understanding of the principles of the invention, reference is made to the following description of typical embodiments thereof as illustrated in the accompanying drawing.

GENERAL DESCRIPTION OF THE PREFERRED EMBODIMENT

Figure 1:
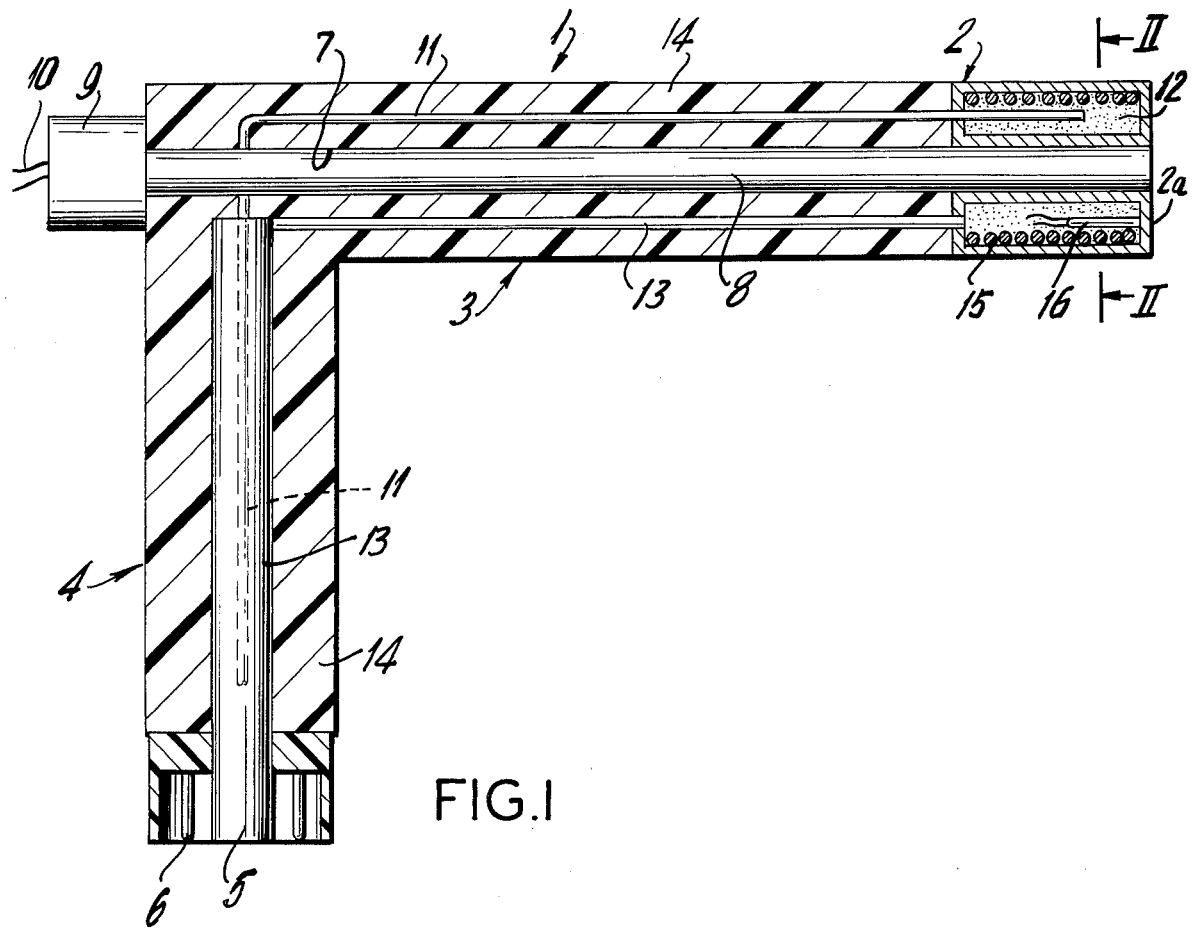
FIG. 1 is a longitudinal sectional view of a probe constructed in accordance with the invention.

Referring to the drawings in particular the invention embodied therein comprises a probe generally designated 1 which comprises a generally L-shaped housing genrally designated 2 having a probe contact end 2a at the end of a cylindrical first housing portion 3 which is connected to a handle portion 4. The handle has a free end which is provided with a mechanical connection 5 and an electrical connection 6. The electrical connection 6 is connected to a suitable electrical connecting line and the mechanical connection 5 includes means for conducting a cooling agent through a cooling conduit 11 which extends from the handle portion into the tubular probe portion 2b and terminates in an evaporation chamber 12 which is located directly against the probe contact surface 2a.

The cylindrical housing portion 3 is formed with a central opening 7 therethrough which receives an ultrasonic conductor 8 which terminates at the contact probe surface 2a. An ultrasonic head 9 for producing ultrasonic waves is mounted at the end of the tubular housing portion 3 which is remote from the contact probe surface 2a. The ultrasonic waves which are produced are directed through the conductor 8 to the surface 2a. Supply leads 10 are provided for supplying energy to the ultrasonic head 9 and for carrying off reflection pulses.

The cooling agent which is directed through the cooling conduit 11 and into the evaporation chamber 12 may be evacuated through a return conduit 13 which at the location of the handle surrounds the conduit 11. Insulation 14, preferably a vacuum insulation, is provided in both the cylindrical portion 3 and the handle portion 4 of the housing 2.

Figure 2:
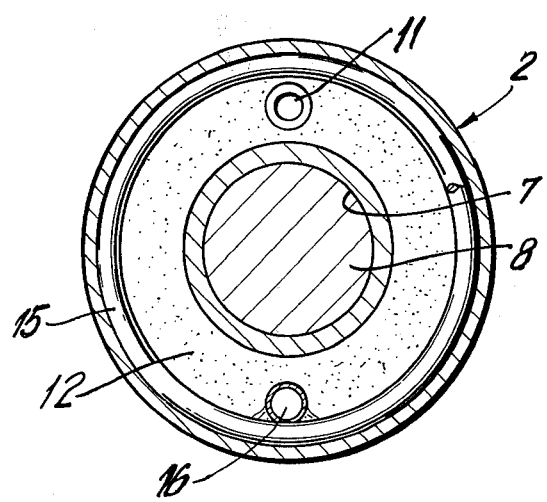
FIG. 2 is a section taken along the line II — II of FIG. 1.

As shown in FIG. 2 the evaporation chamber 12 has a circular cross-section and it is filled with a silver wool for improving the cold dissipation. The supply conduit 11 terminates in an opening in the evaporation chamber as does the return conduit 13 for the evaporated coolant. In order to provide a precise temperature control of the contact surface 2a the evaporation chamber also contains a heater 15 and a temperature sensor 16 is located in the vicinity of the contact surface 2a so that the temperature of the contact surface 2a may be observed and controlled accurately. The ultrasonic conductor 8 is coaxially surrounded by the annular evaporation chamber 12.

In the embodiment of the invention shown the freezing head housing 2 is cylindrical and the contact point comprises a surface 2a which is cricular and planar. This surface 2a of the probe is placed on the tumor to be treated and thereupon the supply of the cooling agent is started. With the aid of the ultrasonic observation device 9 both the tumor and the thickness of the tumor as well as the continuously growing ice ball can be readily observed. Thus the instant at which the supply of the coolant to the evaporation chamber 12 must be stopped and be easily determined by the treating physician.

While a specific embodiment of the invention has been shown and described in detail to illustrate the application of the principles of the invention, it will be understood that the invention may be embodied otherwise without departing from such principles.

What is claimed is:

1. A cryoprobe comprising a first tubular housing portion having a rear end and a forward probe tip opposite end, said first tubular housing portion having a bore extending therethrough from said rear end to said forward probe tip end, said probe tip end having a planar annular probe tip surface around the bore, an ultrasonic conductor extending through the bore and terminating in an end surface substantially aligned with said probe tip end surface, an ultrasonic head secured to said conductor and located adjacent the rear end of said housing for transmitting sonic impulses through said conductor and for receiving reflection impulses back through said conductor, wall means defining an annular evaporation chamber in direct contact with said probe surface and extending around the bore, an electrical resistance heater in said evaporation chamber, a tubular handle portion of said housing connected to said first tubular housing portion and having a handle portion bore therethrough, a supply conduit for coolant medium extending through the handle portion bore and through said first tubular portion to said evaporation chamber, a return conduit for the coolant medium including a portion in said handle portion bore surrounding said supply conduit and a separate return conduit portion in said first housing portion connected into said evaporation chamber, and an electrical and a mechanical connection connected to said heater and to said supply and return conduits adjacent the end of said handle portion for mechanically coupling the supply and return conduits and for electrically coupling said electric resistance heater, respectively, to external sources of coolant medium and electric current.

2. A cryoprobe according to claim 1, wherein said electrical and mechanical connections comprise a socket, said handle portin bore being continued through the center of said socket along with said supply conduit for the coolant medium, and electrical connection means around the periphery of the continuation of the supply conduit in said socket forming a plug-in connection.

3. A cryoprobe according to claim 2, including a temperature sensor in said evaporation chamber connected to said terminal in said connection socket.

* * * * *